(12) United States Patent
Siracusa

(10) Patent No.: US 7,020,942 B2
(45) Date of Patent: Apr. 4, 2006

(54) PORTABLE BORING AND WELDING MACHINE

(75) Inventor: Massimo Siracusa, Catanzaro (IT)

(73) Assignee: Sir Meccanica S.r.L., Catanzaro (IT)

( * ) Notice: Subject to any disclaimer, the term of this patent is extended or adjusted under 35 U.S.C. 154(b) by 46 days.

(21) Appl. No.: 10/355,375

(22) Filed: Jan. 31, 2003

(65) Prior Publication Data

US 2004/0000043 A1    Jan. 1, 2004

(30) Foreign Application Priority Data

Jun. 27, 2002   (IT)   ............................ BO2002A0411

(51) Int. Cl.
*B23P 23/00*   (2006.01)

(52) U.S. Cl. .................. 29/26 A; 29/560; 228/45; 228/119; 219/76.1; 408/24; 408/138; 408/238; 408/124; 408/129; 408/137

(58) Field of Classification Search ................ 29/26 A, 29/26 R, 560, 26 B; 219/76.14, 76.1; 228/45, 228/119; 408/238, 138, 22, 24, 124, 129, 408/137; 82/128, 132, 137, 140–141; 409/231
See application file for complete search history.

(56) References Cited

U.S. PATENT DOCUMENTS

| | | | | |
|---|---|---|---|---|
| 3,774,476 A | * | 11/1973 | Sohnlein et al. ............ | 475/299 |
| 3,803,927 A | * | 4/1974 | Lawler ........................ | 408/138 |
| 4,115,025 A | * | 9/1978 | Petroff ........................ | 408/137 |
| 4,406,566 A | * | 9/1983 | Bauer .......................... | 408/129 |
| 4,550,235 A | * | 10/1985 | Fuwesi ..................... | 219/76.14 |
| 4,580,931 A | * | 4/1986 | Wilger et al. ............. | 408/72 R |
| 5,350,259 A | * | 9/1994 | Russo ........................ | 408/138 |
| 5,983,936 A | * | 11/1999 | Schwieterman et al. .... | 137/615 |
| 6,073,322 A | * | 6/2000 | Russo ........................ | 29/26 A |
| 6,295,707 B1 | | 10/2001 | Siracusa | |
| 6,350,317 B1 | * | 2/2002 | Hao et al. ..................... | 118/71 |
| 6,653,589 B1 | * | 11/2003 | Dolton et al. ............ | 219/76.14 |

FOREIGN PATENT DOCUMENTS

IT         244 733         8/1998

OTHER PUBLICATIONS

Shigley et al., Mechanical Engineering Design, 4th ed., 1993, McGraw-Hill, Inc., pp. 570, 632, and 648.*

* cited by examiner

*Primary Examiner*—Erica Cadugan
(74) *Attorney, Agent, or Firm*—Fay, Sharpe, Fagan, Minnich & McKee, LLP

(57) ABSTRACT

A portable boring and welding machine includes a tool shaft adapted to mount tools for boring and welding workpieces. The shaft extends along an axis and is driven by an electric motor. The motor and the shaft are connected by a helical gearwheel and worm pair, the helical gearwheel being connectable to the tool shaft, and the worm being connected to a drive shaft of the motor itself.

2 Claims, 4 Drawing Sheets

PORTABLE BORING AND WELDING MACHINE

BACKGROUND OF THE INVENTION

The present invention relates to a portable boring and welding machine.

In particular, the present invention relates to a portable boring and welding machine of the type normally used to recondition bores or seats for crankpins, cylinder liners, etc., directly on a machine or part of a machine without having to transport the part to be repaired to a workshop and without having to place the part on a fixed machine tool.

This need is felt especially strongly when repairing the rotating parts of large construction machines such as excavators and cranes or parts of fixed installations that are difficult to dismantle and transport.

A typical example of the use of a portable boring and welding machine is boring (or reaming) a bore to be reconditioned, then adding material by welding and finally finishing the bore by boring (or reaming) to restore the original dimensions and tolerances.

For this purpose, machines with three drive motors are known. The three drive motors are designed to rotate the welding tool used to add material to the inside of the bore, to rotate the boring tool and to drive the tool backwards and forwards along the axis of the bore being machined.

These triple-motor machines are extremely complex on account of the large number of components and, in an attempt to provide a simplified solution, machines with only two motors have been constructed.

Twin-motor machines, although they are much more simple, are not entirely satisfactory: transmission of rotational motion is accomplished by flexible transmission means, such as elastic belts, whose tension must be kept at a defined optimum level using special tensioning devices.

The drive belt must transmit rotational motion to the tool shaft not only during boring/reaming operations but also during the step of adding material by welding. Obviously, the power required for these operations differs considerably and may also vary significantly on account of the differences in diameter of the bores machined, leading to high resistant torque moments and the need for the drive belt to operate within a very wide tension range.

The above mentioned tensioning devices are therefore unable to guarantee the correct belt tension for all the different working conditions, which leads to poor machine performance.

Another drawback closely connected with the use of flexible means for transmitting rotational motion is due to the vibrations created during machining which are propagated from one machine part to another and which have a negative effect on the flexible transmission means.

SUMMARY OF THE INVENTION

The aim of the present invention is therefore to overcome the above mentioned disadvantages by providing a portable boring and welding machine that is functional, practical and simple in construction.

Accordingly, the invention provides a portable boring and welding machine comprising a tool shaft that mounts, at least alternately, means for boring and means for welding workpieces, the shaft extending along a defined axis and having drive means that rotate the shaft about the axis, the drive means comprising a motor that rotates about a different axis, wherein the drive means further comprise rigid means for transmitting rotational motion from the motor to the shaft.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

With reference to the accompanying drawings, the numeral 1 denotes in its entirety a portable boring and welding machine used to recondition crankpin bores or seats, cylinder liners, or, in general, the seats of bearings for rotating machine parts, hereinafter referred to as workpieces and labeled 2 in their entirety.

Figure 1:
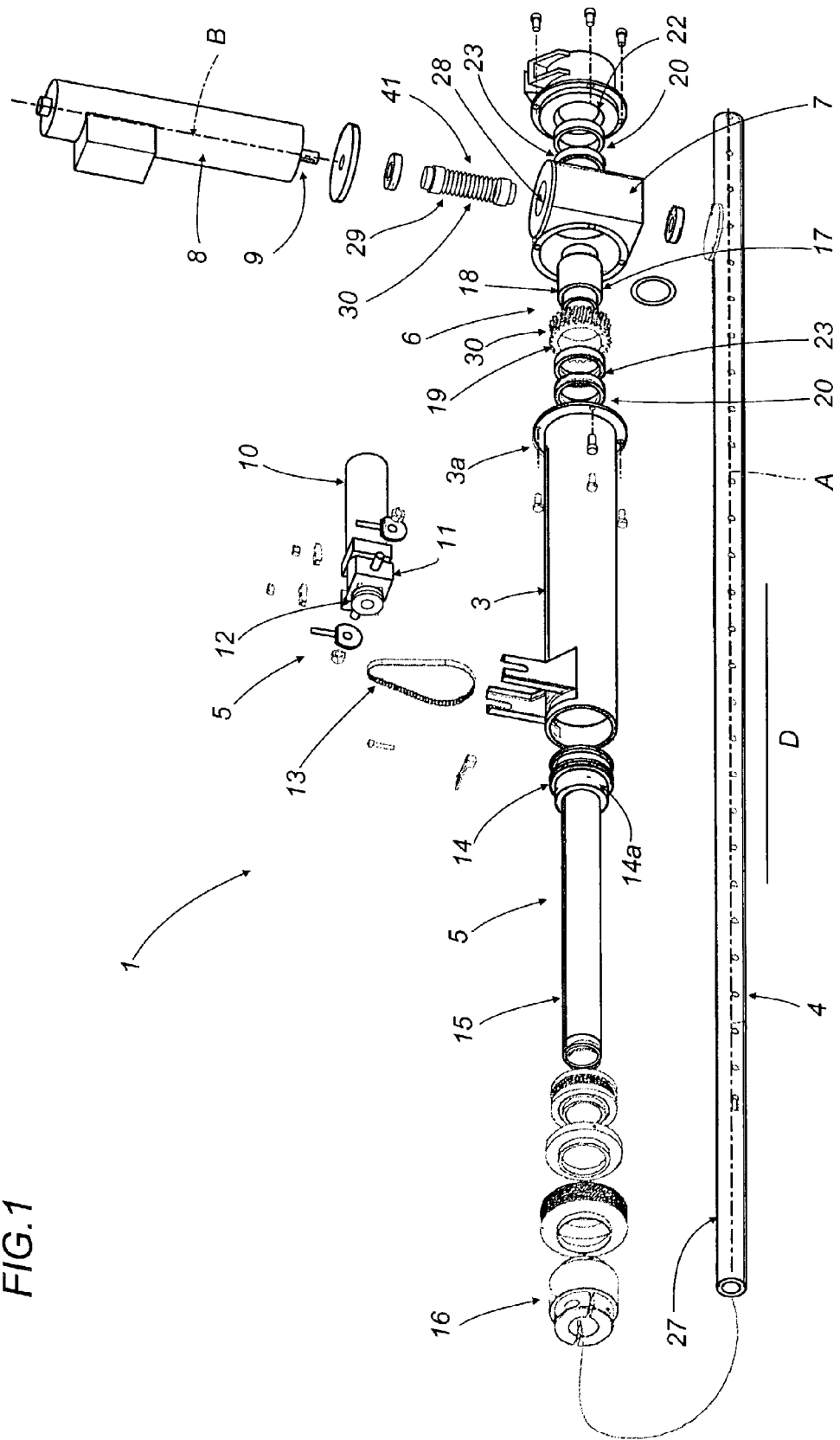
FIG. 1 is an exploded perspective view, with some parts cut away, of a preferred embodiment of the portable boring and welding machine according to the present invention.

As illustrated in FIG. 1, showing a perspective exploded view without guards and covering elements and handles for transportation, the machine 1 comprises a tubular mounting structure 3, a tool shaft 4, a tool shaft feed unit 5 housed in the tubular mounting structure 3 and a drive unit 6 for rotating the tool shaft 4.

The shaft 4 extends along a longitudinal axis A which also constitutes the axis of rotation of the shaft 4.

The rotational drive unit 6 of the tool shaft 4 is housed inside a casing 7 connected to a first, front end 3a of the mounting structure 3.

In the present specification, the term tool shaft is used to mean either the shaft that mounts a boring and/or reaming tool used for stock removal and surface finishing operations or the shaft that mounts the welding torch used for adding material to the workpiece. In other terms, the machine 1 may have either two different shafts, one used for boring and one for welding, or a single shaft on which different tools used to perform these operations can be mounted when required.

These tools and devices, which are not illustrated constitute means for boring and means for welding the workpieces 2 on the machine 1.

As shown in FIG. 1, the rotational drive unit 6 comprises a first electric motor 8 having its own drive transmission shaft 9 that turns about an axis of rotation B. The drive transmission shaft 9 extends from the bottom of the motor 8. The axis A of the tool shaft 4 and the axis of rotation B of the motor 8 are skew relative to each other.

The feed unit 5 comprises a second motor 10, also electrical, connected to a speed reducer 11 which is of customary type and therefore not described in detail. The speed reducer 11 has an output sprocket 12 that is dynamically connected through an elastic belt 13 to a pulley 14 which is keyed to a bush 14a that is screwed to an externally threaded tubular member 15.

Figure 2:
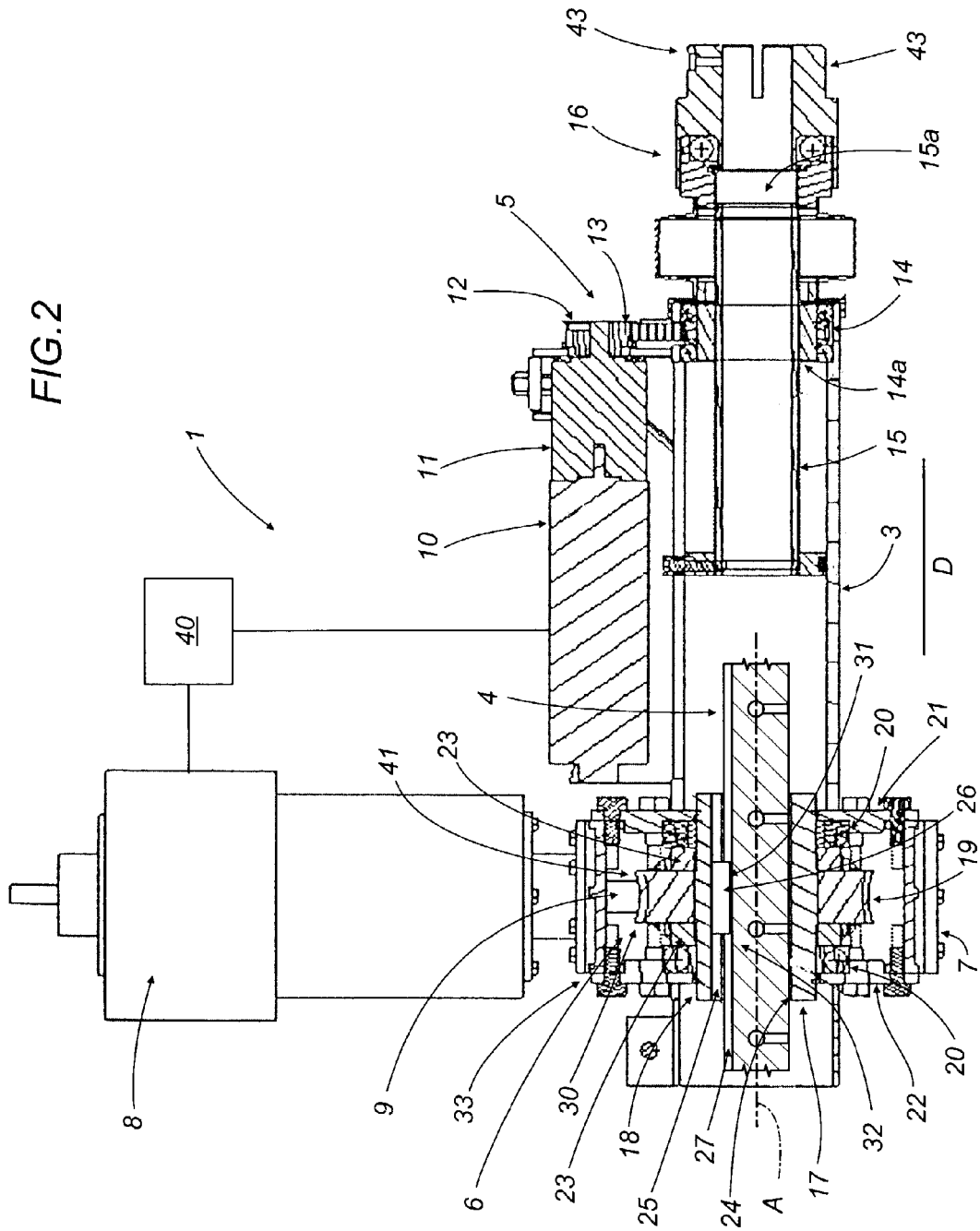
FIG. 2 is a schematic side elevation view, with some parts cut away and others in cross section for clarity, of the machine illustrated in FIG. 1.

With reference to FIG. 2, the threaded tubular member 15 is housed at least partially inside the mounting structure 3 and, at an end 15a of it outside the mounting structure 3, comprises a device 16 for clamping the tool shaft 4. The clamping device 16 is of well-known type and therefore not described in detail.

The tool shaft 4 is designed to mount boring means and welding means which are used alternately to machine the workpieces 2. The boring and welding means are of customary type and therefore not described in any detail in terms of their structure but solely in terms of the functions they perform.

With reference to FIG. 2, which illustrates the boring and welding machine 1 without some of its parts and with other parts shown in cross section to better illustrate others, the rotational drive unit 6 of the tool shaft 4 is mounted inside the casing 7.

The rotational drive unit 6 further comprises a tubular cylindrical element 17 with a globoidal helical gearwheel 19 coaxially keyed to an outer cylindrical surface 18 of it.

The tubular cylindrical element 17 is rotatably supported by the casing 7 on two rolling contact bearings 20 attached to two surfaces 21, 22 that close the bottom of the casing 7. The two bearings 20 are positioned on opposite sides of the globoidal helical gearwheel 19 from which they are separated by two respective spacer rings 23.

The tool shaft 4 is mounted inside the tubular cylindrical element 17. On an internal cylindrical face 24 of the tubular element 17 there is a housing 25 for a key 26. The key 26 is designed to engage with a longitudinal keyway 27 made in the tool shaft 4 so as to synchronously transmit to the shaft 4 the rotational drive motion imparted on the globoidal helical gearwheel 19 while at the same time allowing the tool shaft 4 to slide relative to the cylindrical element 17 in a direction D parallel to the axis A in which the shaft 4 extends.

Advantageously, the key 26 is attached to the cylindrical element 17 by customary fixing means which are not illustrated.

As shown in FIG. 1, the casing 7 has an upper opening 28 in which a worm 29 connected to the drive shaft 9 of the motor 8 is mounted.

The worm 29 is designed to mesh with the globoidal helical gearwheel 19 to form a helical gearwheel and worm pair 30.

The key 26 constitutes a connecting member 31 between the tubular cylindrical element 17 and the tool shaft 4. The connecting member 31, the housing 25 and the longitudinal keyway 27 on the tool shaft 4 together constitute means 32 for engaging the tubular cylindrical element 17 to the tool shaft 4.

The rotating unit 6 constitutes means 33 for rotationally driving the tool shaft 4 about its axis A.

Figure 3:
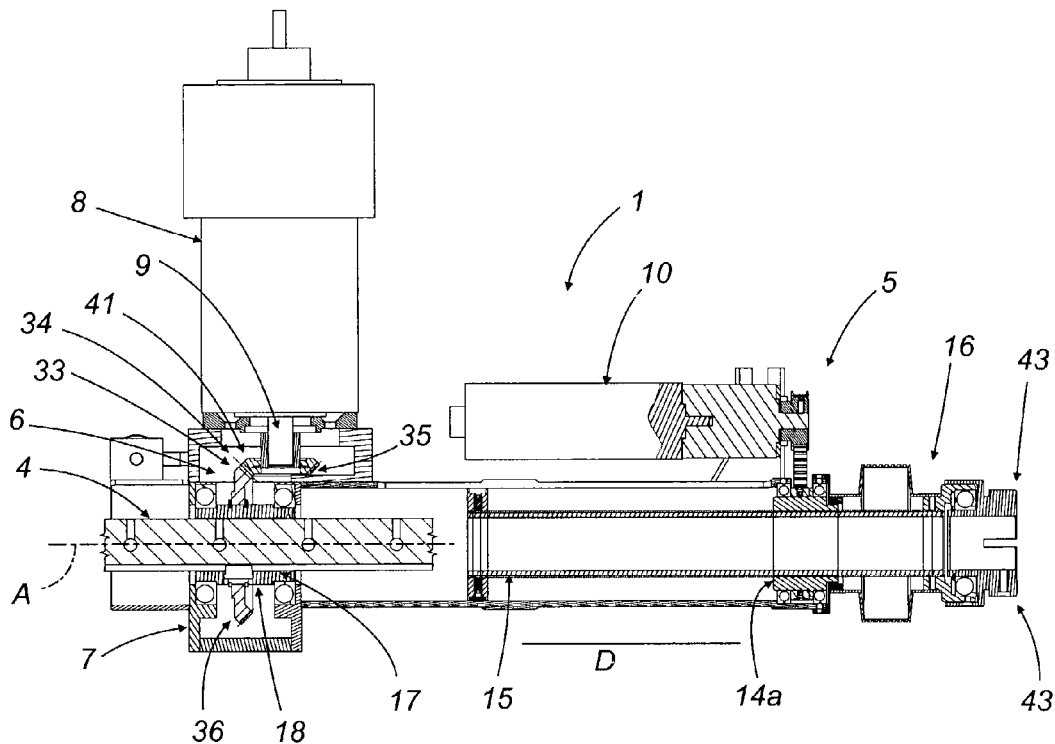
FIGS. 3 and 4 are schematic side elevation views, with some parts cut away and others in cross section, of two different embodiments of the portable boring and welding machine according to the present invention.

As shown in FIG. 3, which schematically illustrates another embodiment of the rotational drive unit 6, the helical gearwheel and worm pair 30 is substituted by a bevel gearwheel pair 34. The gear pair 34 comprises a first bevel gearwheel 35 connected to the transmission shaft 9 of the motor 8, and a second bevel gearwheel 36 keyed to the outer cylindrical surface 18 of the tubular cylindrical element 17, in the same way as described above in connection with the globoidal helical gearwheel 19.

Figure 4:
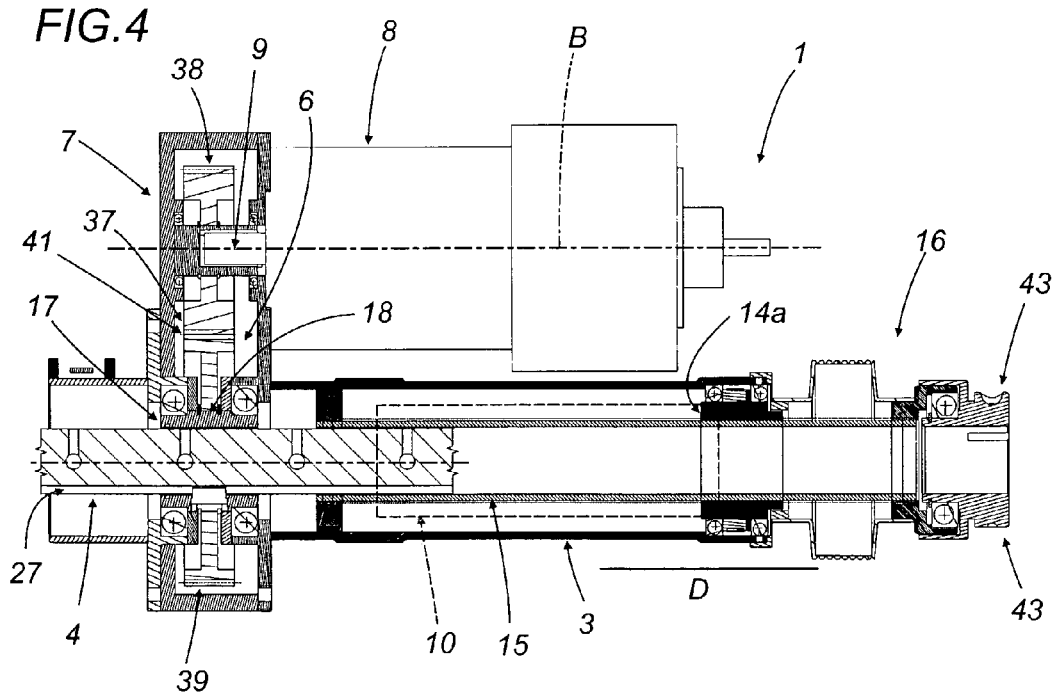

In yet another embodiment, illustrated in FIG. 4, the rotational drive unit 6 comprises a cylindrical gearwheel pair 37 that transmits rotational motion from the motor 8 to the tool shaft 4. The gear pair 37 comprises a first cylindrical gearwheel 38 connected to the transmission shaft 9 of the motor 8, and a second cylindrical gearwheel 39 keyed to the outer cylindrical surface 18 of the tubular cylindrical element 17. The two cylindrical gearwheels 38, 39 rotate about respective parallel axes of rotation B, A. In this embodiment, therefore, the first motor 8 is mounted with its axis of rotation B parallel to the axis A of the shaft.

Advantageously, with reference to each of the embodiments described above, the first and second electric motors 8, 10 may be substituted by pneumatic or hydraulic motors without changing the basic operation of the machine 1.

As illustrated in FIG. 2, the machine 1 comprises a central control unit, preferably electronic, schematically represented as a block 40, which is operatively connected to both of the motors 8 and 10.

The aforementioned helical gearwheel and worm pair 30, bevel gearwheel pair 34 and cylindrical gearwheel pair 37 constitute rigid means 41 for transmitting motion from the motor 8 to the shaft 4.

Figure 5:
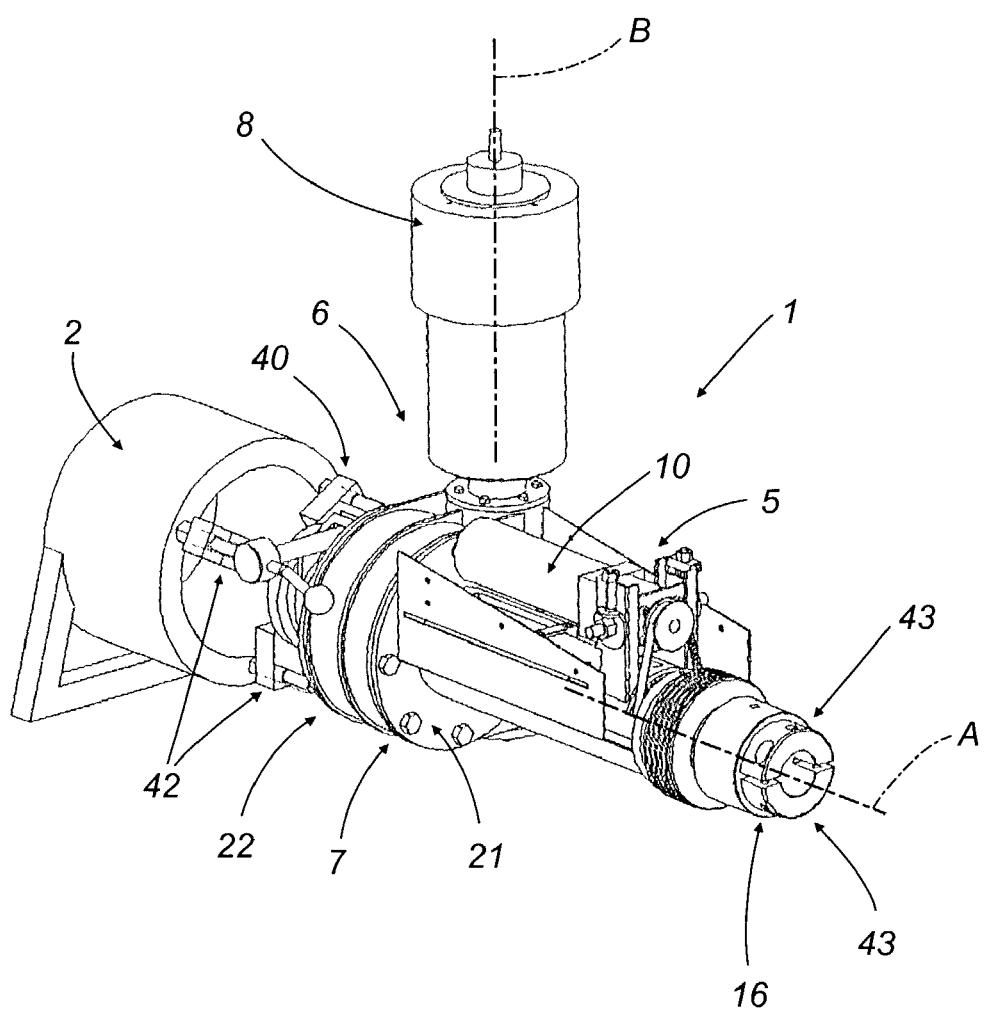
FIG. 5 is a perspective view from above, with some parts cut away for clarity, of the machine of FIGS. 1 and 2 illustrated in a working configuration.

During work, as illustrated in FIG. 5, the boring and welding machine 1 is mounted on the edge of the workpiece 2 in a customary manner using adjustable fixing elements 42.

The fixing elements 42, besides supporting the machine 1 enable the shaft axis A to be exactly aligned with the ideal axis of the workpiece 2, thus guaranteeing that machining operations will meet even the most stringent requirements.

The tool shaft 4, partially illustrated in FIG. 4, is driven in the direction D by the feed unit 5 in well-known manner, as described, for example, in utility model patent No. 244 773 in the name of the same applicant as the present. As described in patent No.244 773, the clamping device 16, which comprises a pair of jaws 43, is supported by the threaded tubular member 15 and is driven by the latter in the direction D as a result of the screwing/unscrewing action of the bush 14a on its outer threaded surface. Obviously, when the jaws 43 are clamped shut on the shaft 4, a translational motion of the tubular member 15 in the direction D causes a simultaneous translational motion of the tool shaft 4.

Once the aforementioned tools and devices (not illustrated) designed to perform the required reconditioning operations on the workpiece 2 have been correctly positioned relative to the workpiece 2 itself, in the direction D, the machine 1 can be started as soon as the jaws 43 have been moved apart to enable the tool shaft 4 to be rotated.

The central control unit 40 activates the drive motor 8 and the latter, through the helical gearwheel and worm pair 30, causes the tool shaft 4 to rotate about its axis A.

Preferably, the electric motor 8 is a direct current motor so that the speed of the tool shaft 4 can be precisely controlled according to the function to be performed, without having to use a geared motor.

The use of the rigid means 41, constituted by the gear pairs 30, 34 and 37, to transmit motion from the motor 8 to the tool shaft 4, advantageously overcomes the disadvantages connected with the transmission of motion using flexible means such as elastic belts or chains. Flexible transmission means cause vibrations during machine operation. Rigid transmission means reduce these vibrations and this, besides improving the performance and efficiency of the boring and welding machine, contributes significantly to increasing machine life and facilitates maintenance.

Rigid transmissions eliminate the need for the time-consuming and costly adjustments and repairs frequently required by the tensioning devices of flexible transmissions. Moreover, rigid transmissions are less subject to wear than flexible transmissions and therefore last longer.

In the present specification, a gearwheel described as being connectable or connected to the drive shaft of a motor means a gearwheel that receives motion from the motor, either directly, through a direct physical connection between the parts, or indirectly, through an interposed coupling, reduction gear, clutch or other transmission system of any kind.

It will be understood that the invention can be subject to modifications and variations without thereby departing from the scope of the inventive concept. Moreover, all the details of the invention may be substituted by technically equivalent elements.

What is claimed is:

1. A portable boring and welding machine for reconditioning workpieces, said portable boring and welding machine comprising:
   a tubular mounting structure;
   a tool shaft adapted to mount an associated boring and/or reaming tool or an associated welding torch, said tool shaft partially contained within said tubular mounting structure;
   a rotational drive unit for rotating the tool shaft about a first axis of rotation to perform work on an associated workpiece, said rotational drive unit comprising: (i) a casing that is connected to the tubular mounting structure; (ii) a first motor having an output drive shaft that rotates about a second axis of rotation that is skewed relative to the first axis of rotation; (iii) a tubular cylindrical element rotatably supported in said casing and rotatable about said first axis of rotation, said tubular cylindrical element coaxially surrounding said tool shaft and connected to said tool shaft to rotate therewith about said first axis of rotation, wherein said tool shaft is also longitudinally translatable relative to said tubular cylindrical element along said first axis of rotation; (iv) a rigid coupling that drivingly connects said output drive shaft of said first motor to said tubular cylindrical element, said rigid coupling comprising a first gear coupled to said output drive shaft to rotate with said output drive shaft, and a second gear engaged with said first gear and coupled to said tubular cylindrical element to rotate with said tubular cylindrical element;
   a tool shaft feed unit for selectively translating said tool shaft longitudinally along said first axis of rotation, said tool shaft feed unit comprising: (i) an externally threaded member that is partially housed in said tubular mounting structure, wherein said tool shaft extends through said externally threaded member; (ii) a clamping device connected to said externally threaded member and located external to said tubular mounting structure, said clamping device adapted for selectively clamping onto said tool shaft to selectively connect said tool shaft to said externally threaded member; (iii) a second motor drivingly engaged with a bush that is, in turn, threadably engaged on said externally threaded member;
   adjustable fixing elements for mounting the portable boring and welding machine to a workpiece to be reconditioned;
   wherein said second motor is selectively activated when said clamping device of said tool shaft feed unit is clamped onto said tool shaft so that said second motor rotates said bush that is threadably engaged on said externally threaded member so that the externally threaded member and said clamping device and said tool shaft are translated longitudinally along said first axis of rotation; and,
   wherein said first motor is selectively activated when said clamping device of said tool shaft feed unit is unclamped from the tool shaft so that the first motor drivingly rotates said tool shaft about said first axis of rotation through said rigid coupling to perform work on said workpiece.

2. The portable boring and welding machine according to claim 1, wherein said tubular cylindrical element is connected to said tool shaft by a longitudinal keyway that extends axially along at least one section of the tool shaft, and at least one key that is engaged with the keyway and with the tubular cylindrical element to allow said longitudinal translation of said tool shaft relative to said tubular cylindrical element along said first axis of rotation in response to activation of said second motor.

* * * * *